(12) United States Patent
Liu et al.

(10) Patent No.: US 10,939,759 B2
(45) Date of Patent: Mar. 9, 2021

(54) COLLECTION APPARATUS FOR STORING PROLATE PHOTOS

(71) Applicant: SHAANXI NORMAL UNIVERSITY, Shaanxi (CN)

(72) Inventors: Jiaojiao Liu, Shaanxi (CN); Yuhu Li, Shaanxi (CN); Wenjun Wang, Shaanxi (CN); Xiaolian Chao, Shaanxi (CN)

(73) Assignee: SHAANXI NORMAL UNIVERSITY, Shaanxi (CN)

( * ) Notice: Subject to any disclaimer, the term of this patent is extended or adjusted under 35 U.S.C. 154(b) by 0 days.

(21) Appl. No.: 16/423,440

(22) Filed: May 28, 2019

(65) Prior Publication Data
US 2019/0274429 A1 Sep. 12, 2019

(51) Int. Cl.
*A47B 88/988* (2017.01)
*A47B 81/00* (2006.01)
*F16B 1/00* (2006.01)
*B60B 33/00* (2006.01)

(52) U.S. Cl.
CPC ............ *A47B 88/988* (2017.01); *A47B 81/00* (2013.01); *F16B 1/00* (2013.01); *B60B 33/00* (2013.01); *F16B 2001/0035* (2013.01)

(58) Field of Classification Search
CPC ....... A47B 63/02; A47B 67/04; A47B 88/988; A47B 81/00; B42F 17/02; B42F 15/06; B42F 17/08; B42F 7/12; F16B 1/00; F16B 2001/0035; B60B 33/00
See application file for complete search history.

(56) References Cited

U.S. PATENT DOCUMENTS

| | | | | | |
|---|---|---|---|---|---|
| 1,391,313 | A | * | 9/1921 | Geoffrion | A47B 63/02 40/385 |
| 5,611,553 | A | * | 3/1997 | Schoeman | A47B 46/00 280/47.35 |
| 6,293,038 | B1 | * | 9/2001 | Chang | A47G 1/0616 40/711 |
| 2002/0000058 | A1 | * | 1/2002 | Chang | G09F 1/12 40/738 |
| 2004/0226210 | A1 | * | 11/2004 | Kaur | G09F 23/00 40/725 |
| 2009/0153006 | A1 | * | 6/2009 | Hazzard | A47B 88/95 312/348.4 |

OTHER PUBLICATIONS

Jiaojiao Liu et al., Study on curl disease management of huge historic photos, Journal of Shaanxi Normal University ( Natural Science Edition), vol. 45, No. 6, Nov. 2017.

\* cited by examiner

*Primary Examiner* — Hiwot E Tefera

(57) ABSTRACT

A collection apparatus for storing prolate photos belongs to the technical field of cultural relic protection equipment and includes multiple drawable arched drawing-type plates disposed in the cabinet, which enables the prolate photos to be fully flattened without repeated and memory curling. At the same time, a magnetic plating board is embedded in the bottom of every arched drawing-type plate, and a plurality of soft magnetic strips are placed on the surface of every arched drawing-type plate, and the magnetic attraction is formed between the magnetic plating board and the soft magnetic strip for fixing the prolate photos. As a result, the collection apparatus is reasonable in design and convenient to use, and is able to durably and stably protect prolate historical photos.

13 Claims, 2 Drawing Sheets

COLLECTION APPARATUS FOR STORING PROLATE PHOTOS

BACKGROUND OF THE PRESENT INVENTION

Field of Invention

The present invention belongs to the technical field of cultural relic protection equipment, relates to a photo collection apparatus, and more particularly to a collection apparatus for storing prolate photos.

Description of Related Arts

The historical photographs freeze a certain moment in the square inch, and vividly record the social events, historical figures, urban and rural appearances, historical sites, and people's livelihoods at that time, which recorded and restored history more realistically than the textual materials. The most common historical archive photos are mostly paper-based, the developing material of the photos is mostly silver salt, and the elder one is protein. The particularity of these materials determines that they are more susceptible to the external environment than the general paper documents, and also decides that their preservation and protection will be more special.

Historical photos are able to be categorized into single-size photos, single-panel photos, prolate (large-size) photos, photo albums and photo frames. The prolate (large-size) photos have a length of 40 cm or more. Due to the large format, the prolate photos are mostly rolled while being stored, some are equipped with a cylindrical carton, and more are not equipped. Compared to ordinary size photos, due to long-term curled storage, most of the paper-based prolate photos are difficult to be opened, have a large degree of curling and varying degrees of folds or even breaks. In addition, some prolate photos are stored with paper, plastic sealing, and frame decoration.

At present, the production of photo-preserving materials in China is not optimistic, and there is almost nowhere to buy "acid-free paper" or "micro-alkaline paper". At present, many museums and archives in China use more "sulphuric acid paper". Because this paper does not require fiber content and purity, added with the application of concentrated sulfuric acid in the process, it is not clear whether the subsequent process is able to completely remove sulfide. Therefore, this type of paper does not meet the requirements for protecting photos and negatives. Plastic sealing, frame decoration and other sealing methods make the photo image layer to be yellowed and blurred during the long-term preservation process. The serious sticky phenomenon occurs among the image layer, the plastic film and the glass plate. In addition, the sealing protection accelerates aging since the photo itself releases harmful gases.

SUMMARY OF THE PRESENT INVENTION

In order to overcome the defects of the prior art described above, the present invention provides a collection apparatus for storing prolate photos, which has a reasonable structural design, is convenient to use, and is able to durably and stably protect prolate historical photos.

The present invention is achieved by a technical solution as follows.

A collection apparatus for storing prolate photos comprises: a cabinet, multiple drawable arched drawing-type plates disposed within the cabinet for respectively placing the prolate photos, multiple magnetic plating boards respectively located at a bottom of the multiple arched drawing-type plates, and multiple soft magnetic strips respectively located at a surface of the multiple arched drawing-type plates for magnetically matching with the multiple magnetic plating boards, so that when in use, a prolate photo to be collected is placed on one of the arched drawing-type plates, and then one of the soft magnetic strips presses against an edge of the prolate photo for fixing.

Preferably, one of the soft magnetic strips presses against a periphery of the prolate photo for fixing.

Preferably, there are 5 to 10 photos on one of the arched drawing-type plates, a surface of an image layer of every photo is covered with a carbon spacer paper, and one of the soft magnetic strips presses against an edge of the uppermost carbon spacer paper for fixing.

Preferably, a width of the magnetic plating boards is in a range of 2-5 cm.

Preferably, one of the arched drawing-type plates has multiple drawing-type holes.

More preferably, there are two drawing-type holes evenly distributed in a front wall thereof.

Preferably, a detachable baffle is disposed at a front wall of the cabinet.

More preferably, the baffle is made of a transparent material.

Preferably, multiple wheels are located around a bottom of the cabinet.

Compared with the prior art, the present invention has beneficial technical effects as follows.

The collection apparatus for storing prolate photos disclosed in the present invention comprises multiple drawable arched drawing-type plates disposed in the cabinet, which enables the prolate photos to be fully flattened without repeated and memory curling. At the same time, a magnetic plating board is embedded in the bottom of every arched drawing-type plate, and a plurality of soft magnetic strips are placed on the surface of every arched drawing-type plate, and the magnetic attraction is formed between the magnetic plating board and the soft magnetic strip for fixing the prolate photos. As a result, the collection apparatus is reasonable in design and convenient to use, and is able to durably and stably protect prolate historical photos.

Further, there are 5 to 10 prolate photos on every arched drawing-type plate according to actual use requirements, but if the photos are directly stacked for a long time, the adhesion between the image layers will be caused, and therefore, the surface of the image layer of every photo is covered with a carbon spacer paper. The carbon spacer paper is able to absorb the moisture in the apparatus, reduce the humidity in the apparatus environment, block the damage of acid gas and oxidizing gas to the image layer, and improve the durability of the photo image.

Further, every arched drawing-type plate has multiple drawing-type holes in a front wall thereof to be convenient for the user to draw the arched drawing-type plate and save space.

Further, a baffle is disposed at the front wall of the cabinet for effectively avoiding environmental pollution such as dust; more preferably, the baffle is made of a transparent material, such as glass and transparent plastic, so as to easily find a photo to be needed cooperating with tags such as labels.

Preferably, multiple wheels are located around a bottom of the cabinet to be convenient for the user to move the cabinet.

Figure 1:
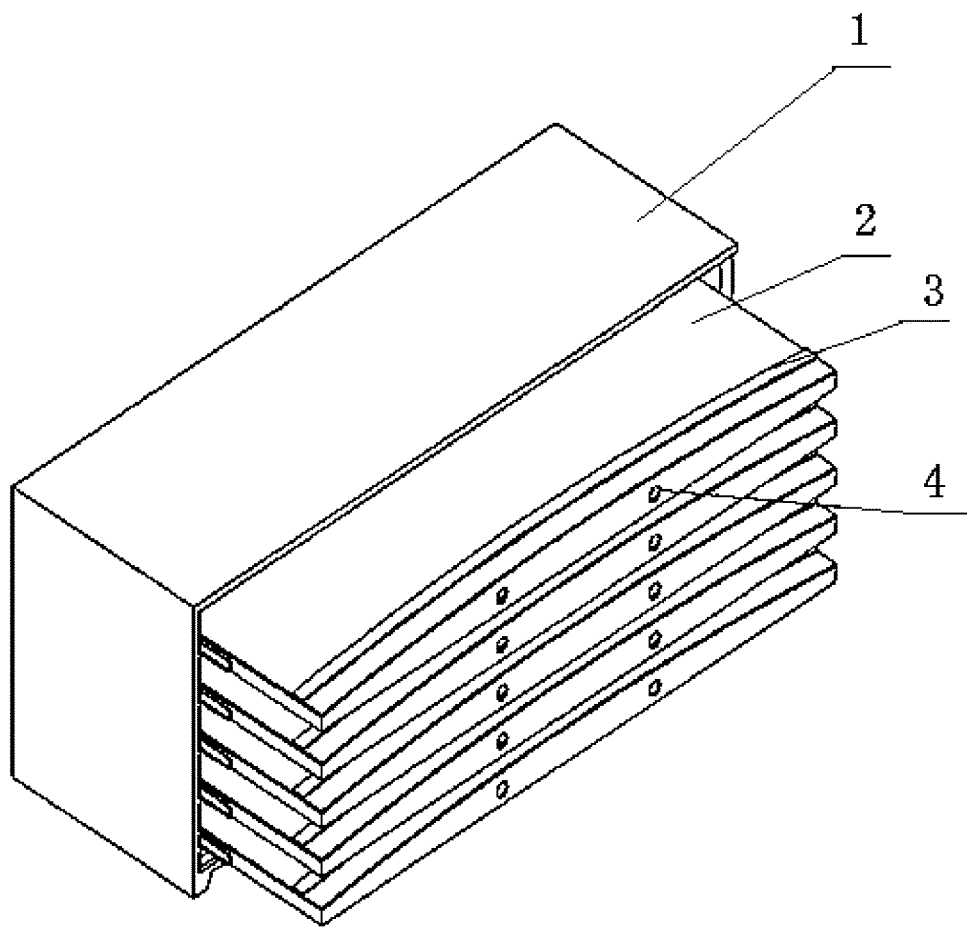
FIG. 1 is a three-dimensionally structural diagram of a collection apparatus for storing prolate photos according to a preferred embodiment of the present invention.

In the drawings, 1: cabinet; 2: arched drawing-type plate; 3: soft magnetic strip; 4: drawing-type hole; 5: carbon spacer paper; 6: magnetic plating board.

DETAILED DESCRIPTION OF THE PREFERRED EMBODIMENT

The present invention will be further described in detail with accompanying drawings as follows.

Figure 2:
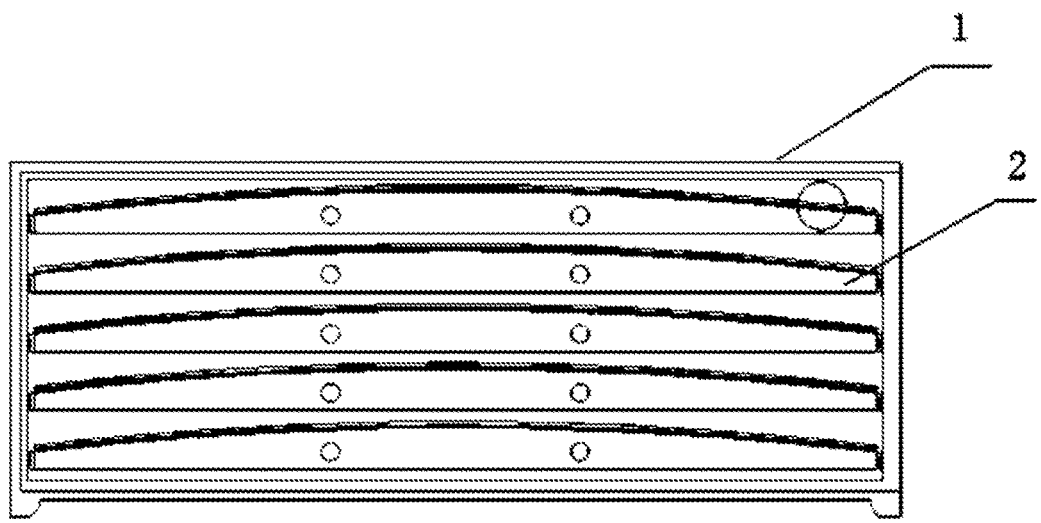
FIG. 2 is a front view of the collection apparatus for storing prolate photos according to the above preferred embodiment of the present invention.

Referring to FIGS. 1 and 2 of the drawings, a collection apparatus for storing prolate photos (whose length is larger than 40 cm) according to a preferred embodiment of the present invention is illustrated, which comprises a cabinet 1, multiple drawable arched drawing-type plates 2 disposed within the cabinet 1 for respectively placing the prolate photos, multiple magnetic plating boards 6 respectively located at a bottom of the multiple arched drawing-type plates 2, and multiple soft magnetic strips 3 respectively located at a surface of the multiple arched drawing-type plates 2 for magnetically matching with the multiple magnetic plating boards 6. When in use, a prolate photo to be collected is placed on one of the arched drawing-type plates 2, and then one of the soft magnetic strips 3 presses against an edge of the prolate photo for fixing.

Preferably, one of the soft magnetic strips 3 presses against a periphery of the prolate photo for fixing more securely and reliably. A width of the magnetic plating boards 6 is in a range of 2-5 cm. The soft magnetic strips 3 and the magnetic plating boards 6 correspondingly form magnetic attraction, so as to integrally fix the prolate photo.

Preferably, one of the arched drawing-type plates 2 has two drawing-type holes 4 in a front wall thereof to be convenient for a user to pull the corresponding arched drawing-type plate 2.

Preferably, a detachable baffle is disposed at a front wall of the cabinet 1 for effectively avoiding environmental pollution such as dust; more preferably, the baffle is made of a transparent material, such as glass and transparent plastic, so as to easily find a photo to be needed cooperating with tags such as labels.

Preferably, multiple wheels are located around a bottom of the cabinet 1 to be convenient for the user to move the cabinet 1.

Figure 3:
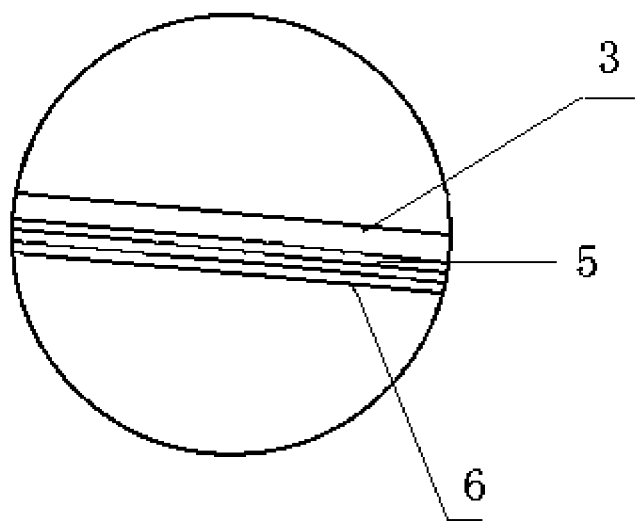
FIG. 3 is a partially enlarged view of the collection apparatus with the prolate photos according to the above preferred embodiment of the present invention.

Referring to FIG. 3, there are 5 to 10 photos on one of the arched drawing-type plates 2, a surface of an image layer of every photo is covered with a carbon spacer paper 5, one of the soft magnetic strips 3 presses against an edge of the uppermost carbon spacer paper 5 for fixing.

Both the cabinet 1 and the arched drawing-type plates 2 are made from a "four-proofing" plate material which is able to prevent fire, insect, mildew and acid, so that the manufactured apparatus is a durable environmental protection collection apparatus. The adopted carbon spacer paper 5 has stable carbon physicochemical properties and is able to absorb light through smaller carbon particles for effectively preventing photoaging. Moreover, the carbon spacer paper 5 is able to absorb the moisture in the apparatus, reduce the humidity in the apparatus environment, block the damage of acid gas and oxidizing gas to the image layer, and improve the durability of the photo image.

In summary, the collection apparatus for storing prolate photos disclosed in the present invention is able to stably and effectively store the prolate historical photos for a long time, which has great significance for protecting precious historical photos.

What is claimed is:

1. A collection apparatus for storing prolate photos, which comprises: a cabinet, multiple drawable arched drawing-type plates disposed within the cabinet for respectively placing the prolate photos, multiple magnetic plating boards respectively located at a bottom of the multiple arched drawing-type plates, and multiple soft magnetic strips respectively located at a surface of the multiple arched drawing-type plates for magnetically matching with the multiple magnetic plating boards, so that when in use, a prolate photo to be collected is placed on one of the arched drawing-type plates, and then one of the soft magnetic strips presses against an edge of the prolate photo for fixing, wherein: there are 5 to 10 photos on one of the arched drawing-type plates, a surface of an image layer of every photo is covered with a carbon spacer paper, and one of the soft magnetic strips presses against an edge of the uppermost carbon spacer paper for fixing.

2. The collection apparatus, as recited in claim 1, wherein: a width of the magnetic plating boards is in a range of 2-5 cm.

3. The collection apparatus, as recited in claim 1, wherein: one of the arched drawing-type plates has multiple drawing-type holes.

4. The collection apparatus, as recited in claim 2, wherein: one of the arched drawing-type plates has multiple drawing-type holes.

5. The collection apparatus, as recited in claim 3, wherein: there are two drawing-type holes evenly distributed in a front wall thereof.

6. The collection apparatus, as recited in claim 4, wherein: there are two drawing-type holes evenly distributed in a front wall thereof.

7. The collection apparatus, as recited in claim 5, wherein: a detachable baffle is disposed at a front wall of the cabinet.

8. The collection apparatus, as recited in claim 6, wherein: a detachable baffle is disposed at a front all of the cabinet.

9. The collection apparatus, as recited in claim 8, wherein: the baffle is made of a transparent material.

10. The collection apparatus, as recited in claim 1, wherein: multiple wheels are located around a bottom of the cabinet.

11. The collection apparatus, as recited in claim 2, wherein: multiple wheels are located around a bottom of the cabinet.

12. The collection apparatus, as recited in claim 6, wherein: multiple wheels are located around a bottom of the cabinet.

13. The collection apparatus, as recited in claim 9, wherein: multiple wheels are located around a bottom of the cabinet.

* * * * *